United States Patent
Matsuyama et al.

(10) Patent No.: US 10,754,560 B2
(45) Date of Patent: Aug. 25, 2020

(54) PREDICTING AND CONTROLLING POWER CONSUMPTION FOR A STORAGE DEVICE

(71) Applicant: Toshiba Memory Corporation, Tokyo (JP)

(72) Inventors: Motohiro Matsuyama, Inagi Tokyo (JP); Yoshihisa Kojima, Kawasaki Kanagawa (JP)

(73) Assignee: TOSHIBA MEMORY CORPORATION, Tokyo (JP)

( * ) Notice: Subject to any disclaimer, the term of this patent is extended or adjusted under 35 U.S.C. 154(b) by 108 days.

(21) Appl. No.: 15/691,667

(22) Filed: Aug. 30, 2017

(65) Prior Publication Data
US 2018/0059977 A1    Mar. 1, 2018

(30) Foreign Application Priority Data
Aug. 30, 2016 (JP) .................. 2016-168443

(51) Int. Cl.
*G06F 3/06* (2006.01)
*G06F 1/3234* (2019.01)

(52) U.S. Cl.
CPC .......... *G06F 3/0625* (2013.01); *G06F 1/3268* (2013.01); *G06F 3/0653* (2013.01); *G06F 3/0659* (2013.01); *G06F 3/0679* (2013.01); *Y02D 10/154* (2018.01)

(58) Field of Classification Search
CPC ........ G06F 3/0625; G06F 1/30; G06F 3/0653; G06F 3/0659; G06F 3/0679
See application file for complete search history.

(56) References Cited

U.S. PATENT DOCUMENTS

| 6,090,151 | A | 7/2000 | Gehman et al. |
| 7,325,104 | B2 | 1/2008 | Satori et al. |
| 8,245,060 | B2 | 8/2012 | Worthington et al. |
| 8,555,095 | B2 | 10/2013 | Byom et al. |
| 9,251,055 | B2 | 2/2016 | Yonezawa et al. |
| 2012/0303171 | A1* | 11/2012 | Barrett .............. H04W 52/0264 700/295 |
| 2014/0379940 | A1* | 12/2014 | Fulkerson ............. G06F 3/0659 710/5 |

(Continued)

FOREIGN PATENT DOCUMENTS

| JP | 2001-085641 A | 3/2001 |
| JP | 2006-195569 A | 7/2006 |
| JP | 2014-225197 A | 12/2014 |

OTHER PUBLICATIONS

Japanese Office Action dated Feb. 26, 2019, filed in counterpart Japanese Patent Application No. 2016-168443, 6 pages (with machine translation).

*Primary Examiner* — Eric Cardwell
(74) *Attorney, Agent, or Firm* — Kim & Stewart LLP

(57) ABSTRACT

A storage device includes a nonvolatile semiconductor memory and a controller. The controller is configured to predict power consumption that is required to carry out operations in accordance with access pattern and throughput received from a host, notify the predicted power consumption to the host, determine operating resources of at least one of the nonvolatile semiconductor memory and the controller to carry out the operations, on the basis of the permissible power consumption received from the host, and carry out the operations using the determined operating resources.

19 Claims, 9 Drawing Sheets

(56) References Cited

U.S. PATENT DOCUMENTS

| | | |
|---|---|---|
| 2016/0147652 A1 | 5/2016 | Miyaji et al. |
| 2016/0170642 A1* | 6/2016 | Miyamoto .............. G06F 3/061 |
| | | 711/103 |
| 2017/0084344 A1* | 3/2017 | Choi ...................... G11C 16/30 |

* cited by examiner

PREDICTING AND CONTROLLING POWER CONSUMPTION FOR A STORAGE DEVICE

CROSS-REFERENCE TO RELATED APPLICATION

This application is based upon and claims the benefit of priority from Japanese Patent Application No. 2016-168443, filed Aug. 30, 2016, the entire contents of which are incorporated herein by reference.

FIELD

Embodiments described herein relate generally to a storage device.

BACKGROUND

For example, a plurality of storage devices is mounted on a disk array. Each disk array is required to operate using a limited amount of power.

DETAILED DESCRIPTION

An embodiment provides a memory system (which is a type of storage device) with good usability.

In general, according to an embodiment, a storage device includes a nonvolatile semiconductor memory and a controller. The controller is configured to predict power consumption that is required to carry out operations in accordance with access pattern and throughput received from a host, notify the predicted power consumption to the host, determine operating resources of at least one of the nonvolatile semiconductor memory and the controller to carry out the operations, on the basis of the permissible power consumption received from the host, and carry out the operations using the determined operating resources.

Memory systems according to embodiments will be described in detail below with reference to the accompanying drawings. Moreover, embodiments of the present disclosure are not limited to these embodiments.

First Embodiment

Figure 1:
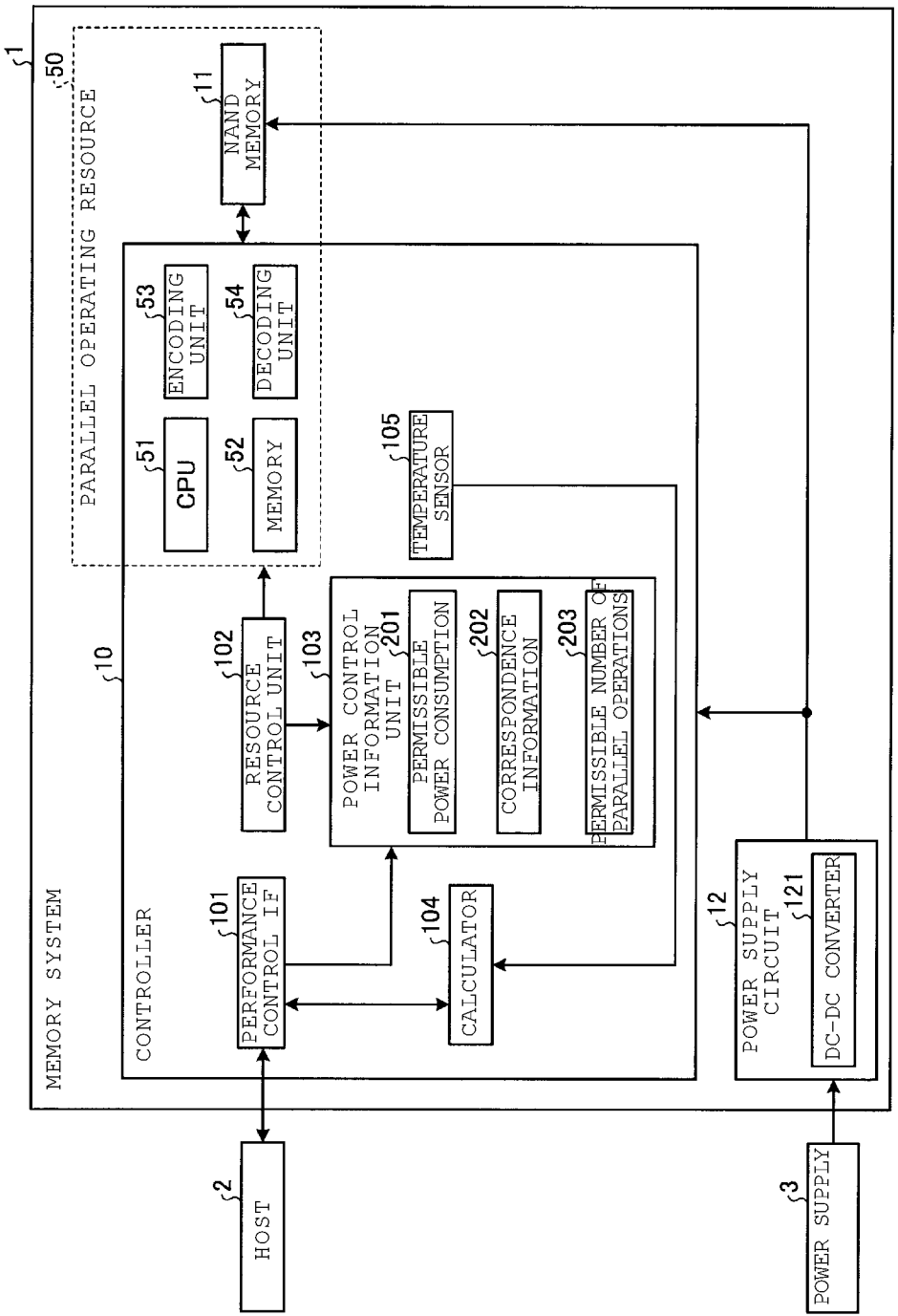
FIG. 1 is a block diagram of a memory system (which is a type of storage device) according to a first embodiment.

FIG. 1 is a block diagram of a memory system (which is a type of storage device) according to a first embodiment. A memory system (which is a type of storage device) 1 is connected to a host 2 and a power supply 3. The power supply 3 supplies power to the memory system 1. The memory system 1 is driven by the power supplied from the power supply 3. The host 2 is a computer, such as a personal computer, a portable computer, a portable communication device, and a server. The memory system 1 is connected to the host 2. Any interface specification can be employed for a communication path between the memory system 1 and the host 2. The host 2 can transmit an access command to the memory system 1. Furthermore, the host 2 can transmit a notification (hereinafter referred to as a host notification) regarding the access command to be transmitted to the memory system 1. The host notification notices the memory system 1 of access commands that may be transmitted in the future and requests the memory system 1 to estimate (predict) the power consumption for that access commands. Furthermore, the host 2 can set a permissible maximum power consumption that can be consumed by the memory system 1. The permissible maximum power consumption is expressed as a permissible power consumption.

Access commands include a read command and a write command. Each access command contains at least a type of access and an access position. The type of access is read or write. The access position is designated by logical address information. The logical address information is information indicating a logical location in an address space that is provided to the host 2 by the memory system 1. As one example, the access position is designated in the form of a logical block address (LBA). The address space that is provided to the host 2 by the memory system 1 is hereinafter expressed as a logical address space. Information indicating a location (position) in the logical address space is expressed as a logical address.

The host notification includes a throughput and an access pattern. The throughput is expressed as input output per second (IOPS), or a bandwidth in megabyte per second (MB/s). That is, the throughput means performance of the memory system 1. IOPS is the number of times of read/write operations with respect to the memory system 1 (which will be described below) can be performed per second. As long as the number of times of read/write operation that can be performed per unit time is indicated, it is possible that a unit time different from one second is employed to indicate the throughput. Furthermore, MB/s is a communication speed between the host 2 and the memory system 1. The access pattern contains a type of access, continuity of access positions in the logical address space, or a ratio between the types of access. An access pattern is expressed as a sequential access when a plurality of access commands are issued in such a manner that the access positions in the logical address space are continuous. When read operations are performed in accordance with a pattern of the sequential access, that access pattern is expressed as a sequential read. When write operations are performed in accordance with the pattern of the sequential access, that access pattern is expressed as a sequential write. An access pattern is expressed as a random access when a plurality of access commands are issued in such a manner that the access positions in the logical address space are not continuous. When read operations are performed in accordance with a pattern of the random access, that access pattern is expressed as a random read. When write operations are performed in accordance with a pattern of the random access, that access pattern is expressed as a random write. The continuity of the access positions in the logical address space is hereinafter expressed as continuity of access or continuity of addresses.

The memory system 1 performs an arithmetic operation of calculating power consumption for achieving performance that is notified by the host notification. That is, the memory system 1 predicts the power consumption. The power consumption that is obtained by the arithmetic operation is expressed as a predicted power consumption. Furthermore, the memory system 1 performs negotiation of the power consumption budget with the host 2 using the predicted power consumption. Here, as an example, the host 2 compares the predicted power consumption with a power consumption that is allocated to the memory system, and transmits, to the memory system 1, the lower one of the predicted power consumption and the power consumption that is allocated to the memory system 1, as the permissible power consumption. The memory system 1 operates at a performance level as high as possible, among performance levels that can be achieved with the permissible power consumption.

The memory system 1 includes a controller 10, a NAND memory 11, and a power supply circuit 12.

The power supply circuit 12 converts the power supplied from the power supply 3, or supplies the power, as is being supplied, to the controller 10 and the NAND memory 11. As one example here, direct-current power is supplied from the power supply 3. The power supply circuit 12 includes a DC-DC converter 121. The power supply circuit 12 converts a voltage of the direct-current power provided from the power supply 3 into voltages that can drive the controller 10 and the NAND memory 11, using the DC-DC converter 121.

The NAND memory 11 is a nonvolatile semiconductor memory that functions as storage. The NAND memory 11 operates using the power supplied from the power supply circuit 12. Any type of a memory other than a NAND memory can be employed as the storage so long as the type of the memory is a nonvolatile memory. For example, it is possible that a NOR-type flash memory is employed as the storage.

The NAND memory 11 includes one or more memory chips, each of which includes a NAND-type memory cell array. A memory cell array includes a plurality of blocks. A block is a minimum unit for erasing data from the memory cell array. Furthermore, each block includes a plurality of pages. A page is a minimum unit for reading data from and writing data to the memory cell array.

The controller 10 performs the write operation of writing data to the NAND memory 11 or the read operation of reading data from the NAND memory 11 according to a command from the host 2. The controller 10 includes a performance control IF 101, a resource control unit 102, a power control information unit 103, a calculator (a predictor or an estimator) 104, and a temperature sensor 105. Furthermore, the controller 10 includes a CPU 51, a memory 52, an encoding unit 53, and a decoding unit 54.

Although not illustrated in FIG. 1, the CPU 51 is connected to the calculator 104, the performance control IF 101, the resource control unit 102, the power control information unit 103, and the memory 52. That is, the performance control IF 101 is connected to the power control information unit 103 through the CPU 51. Furthermore, the performance control IF 101 is connected to the host 2 and the calculator 104. Furthermore, the resource control unit 102 is connected to parallel operating resources 50 and the power control information unit 103.

The memory 52, for example, is a volatile memory. The memory 52 can function as a write buffer for temporarily storing data when data from the host 2 are to be written to the NAND memory 11. Furthermore, the memory 52 functions as a storage area for storing management information related to the memory system 1. The management information is updated on the memory 52. Furthermore, the memory 52 can function as a storage area for temporarily storing data read from the NAND memory 11. Furthermore, the memory 52 can function as a storage area to which a software program that is executed by the CPU 51 is loaded from a nonvolatile memory (for example, the NAND memory 11). For example, the CPU 51 performs control based on the software program that is loaded to the memory 52.

The CPU 51 performs overall control of the controller 10. The CPU 51, for example, performs processing of converting a logical address into a physical address (translation processing), control of garbage collection, management of bad blocks, management of overprovisioning capacity, and the like. The garbage collection, the bad blocks, and the overprovisioning capacity will be described below.

After repetitive programming and erasing, which causes injection and ejection (or, trapping and de-trapping) of electrons into and from a memory cell, more electrons are likely to flow into and out of the memory cell. A change in the memory cell due to the repetitive program and erase cycles is expressed as exhaustion (of the memory cell, the memory cell array, the block, the memory chip, or the NAND memory 11). Due to the exhaustion of the memory cell, a value of data read from the memory cell may be different from a value of data that were written therein. This phenomenon is expressed as an error. The encoding unit 53 encodes user data to be written to the NAND memory 11 for error correction. That is, after being encoded, the user data sent from the host 2 are written to the NAND memory 11. As an algorithm for coding, a variable code rate coding is employed, in which the code rate is dynamically changed. Further, according to the variable code rate coding, by lowering the code rate, it is possible to improve correction capability. The code rate is a ratio of a size of the user data with respect to a size of a frame. The frame includes the user data and corresponding error correcting code. The frame refers to a unit of data by which the error correction is performed. The correction capability, for example, is the maximum number of bits of error which can be corrected. As the memory array is exhausted, a bit error rate of the memory array increases. When the bit error rate exceeds the correction capability, the user data becomes unreadable. The CPU 51 decreases the code rate according to the exhaustion of the memory cell, so that the number of error bits does not exceed the correction capability.

The decoding unit 54 performs decoding of the user data read from the NAND memory 11. By performing the decoding, the decoding unit 54 performs detection and correction of an error that is included in the user data which is read from the NAND memory 11. The decoding unit 54 reports the bit error rate to the CPU 51. The CPU 51 changes the code rate based on the reported bit error rate.

Moreover, the functions of the encoding unit 53 and the decoding unit 54 may be realized by the CPU 51 executing firmware. Furthermore, the encoding unit 53 may be configured in such a manner that the encoding according to a plurality of types of algorithms can be performed, and the decoding unit 54 may be configured in such a manner that the decoding according to a plurality of types of algorithms can be performed.

The controller 10 adjusts performance level of the memory system 1. According to the first embodiment, the controller 10 includes a plurality of resources (parallel operating resources 50) that are caused to operate in a parallel manner. To adjust the performance level, the resource control unit 102 changes the number of parallel operating resources 50 (the number of parallel operations) that are caused to operate in a parallel manner, among a plurality of parallel operating resources 50.

The parallel operating resources 50 is a component of the memory system 1, a software program, or the like. The parallel operating resources 50 may be one of (1) to (4) described below.

(1) Component or a software program for performing information processing between the memory system 1 and the host 2

(2) Component or a software program for performing the information processing between the controller 10 and the NAND memory 11

(3) Component or a software program for performing the information processing within the controller 10

(4) Component or a software program for performing the information processing within the NAND memory 11

According to the present embodiment, what is regarded as the parallel operating resources 50 is the CPU 51, the memory 52, the encoding unit 53, the decoding unit 54, the NAND memory 11, or the like. Examples of the parallel operating resources 50 are specifically described below.

Figure 2:
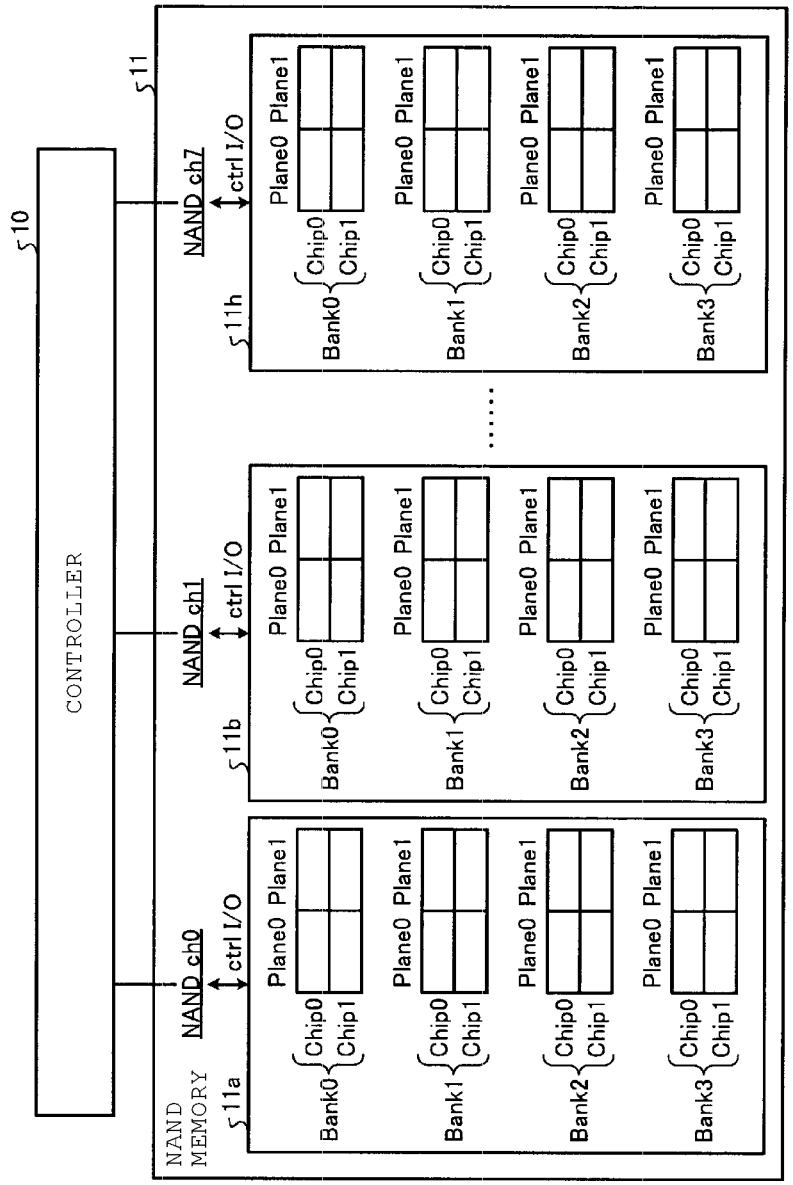
FIG. 2 illustrates a configurational example of a NAND memory to explain one example of parallel operating resources.

FIG. 2 illustrates a configurational example of the NAND memory 11 according to the first embodiment to explain one example of the parallel operating resources 50. The NAND memories 11 are connected in parallel to the controller 10 through eight channels (ch0 to ch7). By controlling the channels in a parallel manner, the memory system 1 can cause eight channel elements 11a to 11h (such as the memory chips in each channel) to operate in a parallel manner. Although the number of channels of the NAND memories 11 is eight in the present embodiment, any other numbers can be applicable. The channels correspond to the parallel operating resources 50. The controller 10 can control the number of channel elements that operate in a parallel manner, as the number of parallel operations. Moreover, the encoding unit 53 may be configured in such a manner that the encoding of the user data is independently performed for every channel element. That is, the encoding unit 53 performs the encoding of a plurality of pieces of user data of which write destination is in different channel elements at the same time. Furthermore, the decoding unit 54 may be configured in such a manner that the decoding of the user data is independently performed for every channel element. That is, the decoding unit 54 performs the decoding of a plurality of pieces of user data of which read source is in different channel elements at the same time.

Each of the channel elements 11a to 11h includes a plurality of banks (which, in this case, are four banks, Bank 0 to Bank 3). Each bank includes one or more memory chips (which, in this case, two memory chips, Chip 0 and Chip 1). The controller 10 4 can cause four banks at the maximum to operate in an interleaving manner. The bank interleaving is a technique in which, while one or more memory chips that belongs to one bank access its memory cell array, the controller 10 issues an access command to or transfers data from/to another bank. According to the bank interleaving, the total time of communication and processing between the NAND memory 11 and the controller 10 can be shortened (i.e., the throughput can be improved). The banks correspond to the parallel operating resources 50. The controller 10 can control the number of banks that are caused to operate in a bank interleaving manner, as the number of parallel operations.

As a generalization of controlling the number of channels operating in parallel and controlling the number of banks operating in an interleave manner, the controller 10 may control the number of memory chips operating in parallel to achieve the target power consumption, or the target performance. Here, the number of memory chips operating in parallel is counted over the entire memory system 1, not considering the channel or the bank to which a memory chip belongs.

A memory cell array of each memory chip, for example, is divided into two districts, i.e., a plane 0 and a plane 1. Each of the plane 0 and the plane 1 includes a plurality of blocks. The plane 0 and the plane 1 each include peripheral circuits (for example, a row decoder, a column decoder, a page buffer, a data cache, and the like) that are independent of one another. The controller 10 can perform the erasing processing/write processing/read processing on each plane at the same time. That is, it is possible that the controller 10 causes the plane 0 and the plane 1 to operate in a parallel manner. Alternatively, the memory cell array of each memory chip may be divided into three or more districts, and may not be divided at all. The planes correspond to the parallel operating resources 50. The controller 10 can control the number of planes that are caused to operate at the same time, as the number of parallel operations.

The CPU 51, for example, may be configured with a plurality of processors. In this case, the processors correspond to the parallel operating resources 50. The controller 10 can control the number of processors that operate at the same time, as the number of parallel operations.

Furthermore, the CPU 51 can perform translation processing independently in each of the plurality of processes. The process is a unit of processing that is performed based on a software program. In some cases, the process may be referred to as a task. For example, the CPU 51 divides the logical address space into a plurality of portions, and can cause the translation processing operations on portions of the logical address space to be performed independently from each other. The processes of the translation processing correspond to the parallel operating resources 50. The controller 10 can control the number of processes that are performed at the same time, as the number of parallel operations. Moreover, processing other than the translation processing may be performed independently for each of the plurality of processes.

Furthermore, the memory 52 may include a plurality of unit areas, each of which is configured in such a manner that power can be individually supplied and individually stopped to be supplied. The unit areas correspond to the parallel operating resources 50. The controller 10 can control the number of unit areas to which the power is supplied, as the number of parallel operations.

Moreover, the number of parallel operation may be a combination of some of or all of the numbers described above. For example, combinations of the number of channels that operate in a parallel manner, the number of banks that operate in an interleaving manner, the number of memory chips that operate in a parallel manner, and the number of planes that operate at the same time may be controlled as the number of parallel operations. The combination, for example, is a number that results from a predetermined arithmetic operation. For example, the arithmetic operation is multiplication. Furthermore, the number of parallel operations may be expressed as progression vector that includes each of some of or all of the examples described above as an element (component). In a case where the numbers of parallel operations are expressed as a vector, a change of the number of parallel operations is a change of values of some of or all of elements (components) of the vector that is a tuple of the numbers of parallel operations. Specifically, an increase of the number of parallel operations is a change of values of some or all of elements (components) of the vector, in the direction of improving performance level. Similarly, a decrease in the number of parallel operations is a change of values of some or all of elements of the vector, in the direction of degrading performance level.

The performance control IF 101 receives the host notification that is sent from the host 2. The performance control IF 101 sends the host notification received from the host 2, to the calculator 104. That is, the calculator 104 is notified of the host notification from the host 2 through the performance control IF 101. Furthermore, the performance control IF 101 receives the permissible power consumption that is sent from the host 2. The performance control IF 101 stores the permissible power consumption received from the host 2, as a permissible power consumption 201, in the power control information unit 103. The permissible power consumption 201 is read by the calculator 104. That is, the calculator 104 is notified of the permissible power consumption from the host 2 through the performance control IF 101 and the power control information unit 103.

The calculator 104 calculates the permissible number of parallel operations, based on the permissible power consumption 201, the host notification, and correspondence information 202. The permissible number of parallel operations is the number of parallel operations to achieve a highest performance within the given power consumption budget, or to achieve a specified performance. The calculator 104 stores the calculated permissible number of parallel operations, as a permissible number of parallel operations 203, in the power control information unit 103. The resource control unit 102 controls the parallel operating resources 50 in such a manner that the number of parallel operations is less than or equal to the permissible number of parallel operations 203.

The correspondence information 202 is information that stipulates at least a correspondence between the performance level and the power consumption. In addition to the performance level and the power consumption, the correspondence information 202 includes one or more variables. Any data structure may be employed as a data structure of the correspondence information 202. The data structure of the correspondence information 202, for example, is a table, a function, or a combination of these. An example of each of the variables of the correspondence information 202, and an example of each of the properties will be described below.

Figure 3:
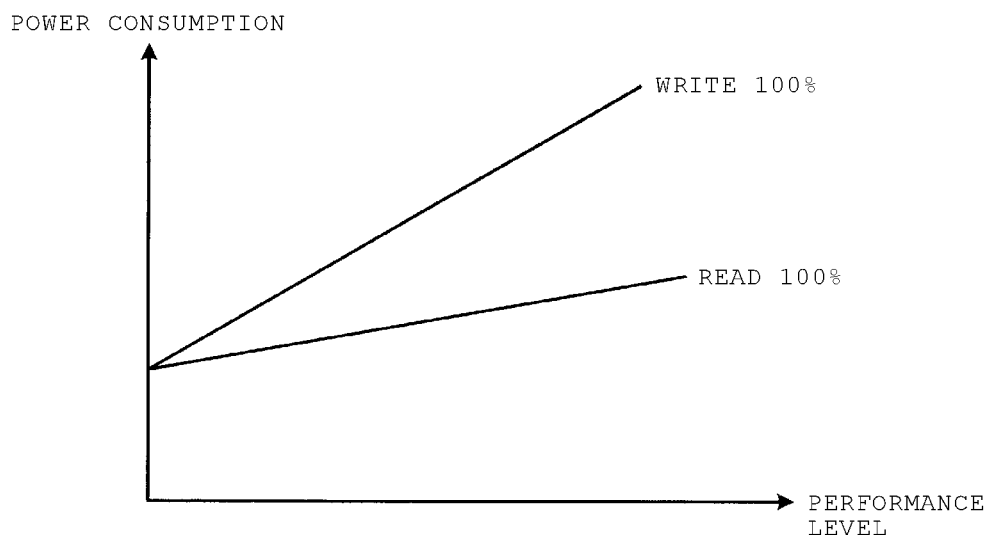
FIG. 3 is a graph illustrating one example of a relationship among a ratio of types of access, power consumption, and a performance level.

For example, a ratio between types of access is prepared as a variable of the correspondence information 202. FIG. 3 is a graph illustrating a relationship among the ratio between the types of access, the power consumption, and the performance level, which is stipulated by the correspondence information 202. In FIG. 3, it is assumed that prescribed values are set for variables, respectively, other than the ratio between the types of access, the power consumption, and the performance level. According to this example, as the performance level (such as a bandwidth in MB/s) increases, the power consumption increases. In a case where a write ratio is 100%, an amount of increased power consumption with respect to an amount of increased performance level is large compared with a case where a read ratio is 100%. The ratio of the type of access, for example, is transmitted as the host notification from the host 2. Furthermore, the controller 10 may measure the ratio between types of access referring to the access history, and the calculator 104 may use the ratio obtained by the measurement. An effect of the ratio between the types of access on a relationship between the performance level and the power consumption is not limited to the example in FIG. 3.

Figure 4:
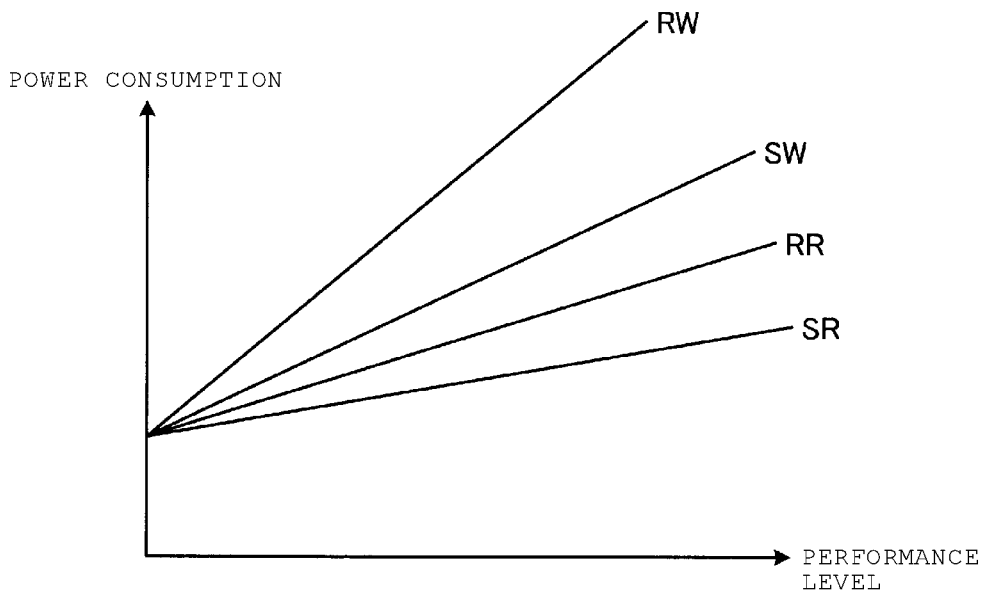
FIG. 4 is a graph illustrating one example of a relationship among continuity of access positions, the power consumption, and the performance level.

For example, the continuity of access positions is prepared as a variable of the correspondence information 202. FIG. 4 illustrates one example of a relationship among the continuity of access positions, the power consumption, and the performance level, which is stipulated by the correspondence information 202. In FIG. 4, it is assumed that prescribed values are set for variables, respectively, other than the continuity of access positions, the power consumption, and the performance level. Among the random write (RW), the random read (RR), the sequential write (SW), and the sequential read (SR), a ratio of an amount of increased power consumption to an amount of increased performance level (such as a bandwidth in MB/s) is the highest in the case of the random write, and is the lowest in the case of the sequential read. Furthermore, the ratio of the amount of increased power consumption to the amount of increase performance level is higher in the case of the sequential write than in the case of the random read. The continuity of access positions, for example, is transmitted as the host notification from the host 2. Furthermore, the controller 10 may measure the continuity of access positions referring to the access history, and the calculator 104 may use the continuity positions of access that is obtained by the measurement. In this case, continuity of physical addresses is employed instead of continuity of logical addresses to measure the continuity, so that the effect of the continuity of the access on the power consumption can be estimated more accurately. Moreover, the effect of the continuity of access positions on the relationship between the performance level and the power consumption is not limited to the example in FIG. 4.

Figure 5:
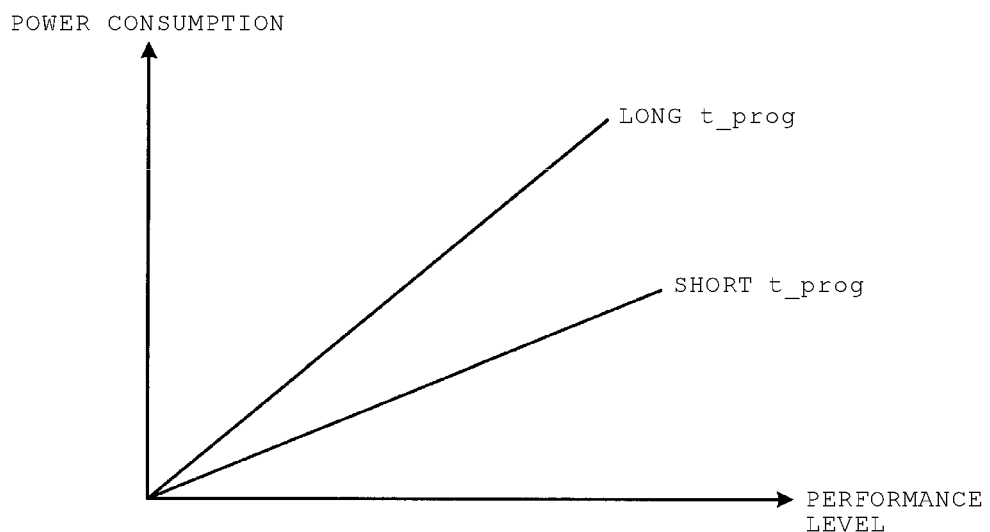
FIG. 5 is a graph illustrating one example of a relationship among programming time (t_prog), the power consumption, and the performance level.

For example, a period of time (t_prog) required for the write processing on the memory cell array is prepared as a variable of the correspondence information 202. When writing the user data to the NAND memory 11, the controller 10 transmits, to the memory chip, a write command that causes data of unit size to be written to the memory cell array of to the memory chip. When the memory chip receives the write command from the controller 10, a state of the memory chip transitions from a ready state to a busy state. While the memory chip writes the data to the memory cell array (this is said to perform programming), the state of the memory chip remains in the busy state. When the programming of the data to the memory cell array is completed, the state of the memory chip transitions from the busy state to the ready state. Whether the state of the memory chip is in the busy state or the ready state is notified to the controller 10 through a ready busy signal line that is included in a channel. "t_prog" means a period of time during which one memory chip remains in the busy state according to the write command. In other words, t_prog is a period of time required for one memory chip to execute the write command (i.e., programming operation to the memory cell). FIG. 5 is a graph illustrating one example of a relationship among t_prog, the power consumption, and the performance level, which is stipulated by the correspondence information 202. In FIG. 5, it is assumed that prescribed values are set for variables, respectively, other than t_prog, the power consumption, and the performance level. For example, as t_prog decreases, the period of time required to program one page of data to the memory cell array decreases. In a case where conditions other than t_prog are the same, the average power during the busy state required to program one page of data is almost constant regardless a value of t_prog. That means, to program one page of data within a certain time (to achieve a certain performance level), the average power during the certain time becomes higher as t_prog is longer. Therefore, the amount of increased power consumption with respect to the amount of increased performance level is larger in a case where t_prog is a first value than in a case where t_prog is a second value that is smaller than the first value. A factor of t_prog affecting the relationship between the performance level and the power consumption, for example, is obtained in advance by the measurement or the calculation, and, based on the obtained factor, the correspondence information 202 is generated. The controller 10 can measure t_prog by monitoring the ready busy signal. For example, the controller 10 may measure t_prog, and the calculator 104 may use t_prog that is obtained by the measurement.

t_prog tends to decrease as the memory cell is exhausted. This is because the injection of electrons into the memory cell becomes easier. Using this tendency, an index indicating a degree of the exhaustion of the memory cell may be used instead of t_prog. For example, the number of times erasing operations are performed, the cumulative power-on time (power on hours), a total amount of data written to the memory system 1, a total amount of data written to the NAND memory 11, or the like is available as the index indicating the degree of the exhaustion of the memory cell. The number of times of the erasing operations performed, the cumulative power-on time, the total amount of data written to the memory system 1, or the total amount of data written to the NAND memory 11, for example, is recorded as statistical information by the controller 10. The calculator 104 can acquire and use the number of times that the erasing is performed, the cumulative power-on time, the total amount of data written to the memory system 1, or the total amount of data written to the NAND memory 11, which is recorded. An index indicating the degree of the exhaustion of the memory cell is indicated in any type of units. For example, the index indicating the degree of the exhaustion of the memory cell is indicated par each page, par each block, par each memory chip, or par each NAND memory 11. Moreover, the effect of t_prog on the relationship between the performance level and the power consumption is not limited to an example in FIG. 5.

Figure 6:
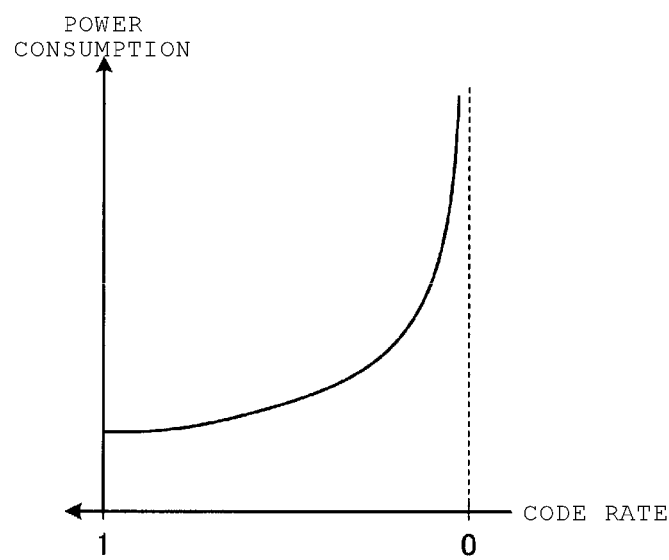
FIG. 6 is a graph illustrating one example of a relationship between a code rate and the power consumption.
Figure 7:
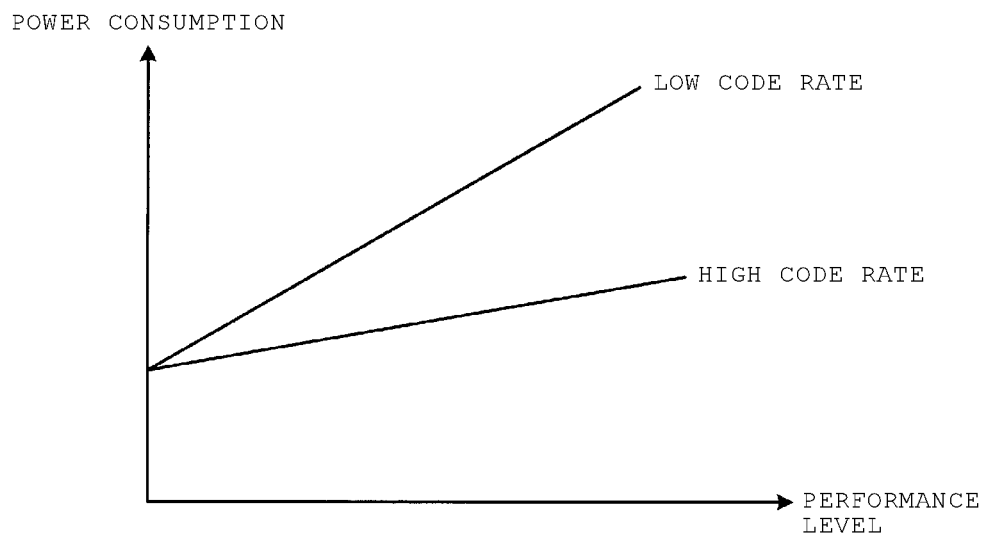
FIG. 7 is a graph illustrating one example of a relationship among the code rate, the power consumption, and the performance level.

For example, the code rate is prepared as a variable of the correspondence information 202. FIG. 6 is a graph illustrating a relationship between the code rate and the power consumption, which is stipulated by the correspondence information 202. In FIG. 6, it is assumed that prescribed values are set for variables, respectively, other than the code rate and the power consumption. A code rate R can take a value that is greater than 0 and equal to or smaller than 1. In a case where the code rate R is 1, the power consumption is at a minimum level. The closer the code rate R is to 0, the more the power consumption becomes. FIG. 7 is a graph illustrating a relationship among the code rate, the power consumption, and the performance level, which is stipulated by the correspondence information 202. In FIG. 7, it is assumed that prescribed values are set for variables, respectively, other than the code rate, the power consumption, and the performance level. The amount of increased power consumption with respect to the amount of increased performance level is larger in a case where the code rate is a third value than in a case where the code rate is a fourth value that is greater than the third value. A factor of the code rate affecting the relationship between the performance level and the power consumption, for example, is obtained in advance by the measurement or the calculation, and the correspondence information 202 is generated based on the obtained factor. The controller 10 controls the code rate, and the calculator 104 acquires and uses the code rate. Moreover, the effect of the code rate on the relationship between the performance level and the power consumption is not limited to examples in FIGS. 6 and 7.

For example, an overprovisioning ratio is prepared as a variable of the correspondence information 202. The overprovisioning ratio is one index indicating a relationship between an entire storage capacity of the NAND memory 11 (a physical capacity) that is available for storing the user data, and a user capacity. The user capacity is a capacity in the logical address space to store the user data provided to the host 2 by the memory system 1. Specifically, the overprovisioning ratio is obtained by dividing the overprovisioning capacity by the user capacity.

The overprovisioning capacity is a value obtained by subtracting the user capacity from the physical capacity (a sum of areas that are available for storing the user data). An area that is available for storing the user data is expressed here as an available area. The user data are data sent from the host 2. Moreover, a state of the user data stored in the available area is any one of a valid state and an invalid state. In a state where first user data are stored in the NAND memory 11, in a case where second user data are sent from the host 2 with the same logical address as in the case of the first user data being designated, the controller 10 writes the second user data to a block that has an empty page, and regards the first user data as the invalid user data. The "empty" state here refers to a state where neither invalid data nor valid data are stored. The empty page is an empty area that is available for writing data. According to this technique, as the write is performed on the NAND memory 11, the invalid user data and the valid user data are stored in each block. The valid data refers to data in the latest (current) state. In a case where a plurality of pieces of user data are stored in the NAND memory 11 with the same logical address being designated, the latest state refers to a state of user data that has been most recently (last) written by the host 2 among the plurality of pieces of user data. The invalid data refers to user data other than the user data that has been written not most recently by the host 2, among the plurality of pieces of user data.

The overprovisioning ratio can vary dynamically. For example, as the number of bad blocks increases, the overprovisioning ratio decreases. The bad block refers a block that, among blocks that are included in the NAND memory 11, is determined as being non-available. A criterion for determining the non-availability is determined differently. For example, in a case where the bit error rate of the user data stored in a certain block exceeds a prescribed value, the controller 10 recognizes the block as a non-available block (that is, a bad block). Furthermore, for example, as the code rate decreases, the overprovisioning ratio decreases. This is because, as the code rate decrease, a net size (in other words, a size of the available area) of an area to which the user data can be written decreases.

The overprovisioning ratio affects performance of the garbage collection. The garbage collection refers to processing of moving (copying) valid data from one block (a GC source block) to an empty area of a different block (a GC destination block) and then manages all pieces of data that are stored in the GC source block, as pieces of invalid data. The GC source block is managed as a free block after the garbage collection. Moreover, a set of free blocks is a pool of free blocks. Each free block is in a state where no data are stored by performing the erasing operation.

As the user data sent from the host 2 are written to the NAND memory 11, an amount of invalid user data increases and the number of the free blocks decreases. The CPU 51 performs the garbage collection in order to generate free blocks. That is, there are generally two types of write operations of writing user data to the NAND memory 11. One of the two types is a write operation (hereinafter referred to as host write) of writing the user data sent from the host 2. The other of the two types of write operation is a write operation (hereafter referred to as garbage collection write) that is based on the garbage collection. A ratio between an amount of data written to the NAND memory 11 through the host write and an amount of data written to the NAND memory 11 through the garbage collection write is controlled by the CPU 51 according to the number of free blocks or the amount of valid data in the GC source block, which are directly or indirectly affected by the overprovisioning ratio. As one example, a value that is obtained by dividing the amount of data written to the NAND memory 11 through the garbage collection write by the amount of data written to the NAND memory 11 through the host write is expressed a gear ratio. The CPU 51 controls the gear ratio according to the overprovisioning ratio. The CPU 51 controls the performance of the garbage collection according to the gear ratio and the amount of data written to the NAND memory 11 through the host write. Specifically, for example, the CPU 51 performs an arithmetic operation of obtaining the gear ratio in accordance with the overprovisioning ratio. Then, the CPU 51 performs the arithmetic operation of obtaining a target amount of data that have to be written to the NAND memory 11 by the garbage collection write, from the amount of data written to the NAND memory 11 by the host write and the gear ratio. Then, the CPU 51 performs the garbage collection until the target amount of data obtained by the arithmetic operation is reached.

Figure 8:
FIG. 8 is a graph illustrating one example of a relationship between a gear ratio and an overprovisioning ratio.

FIG. 8 is a graph illustrating a relationship between the gear ratio and the overprovisioning ratio. As illustrated, as the overprovisioning ratio decreases, the CPU 51 increases the gear ratio. That is, the CPU 51 increases a ratio of a total amount of data (a sum of the host write and the GC write) that are actually written to the NAND memory 11 to an amount of data that are sent to the memory system 1 by the host write, as the overprovisioning ratio decreases. Therefore, in a case where conditions other than the power consumption and the overprovisioning ratio are the same, the power consumption increases as the overprovisioning ratio decreases.

Figure 9:
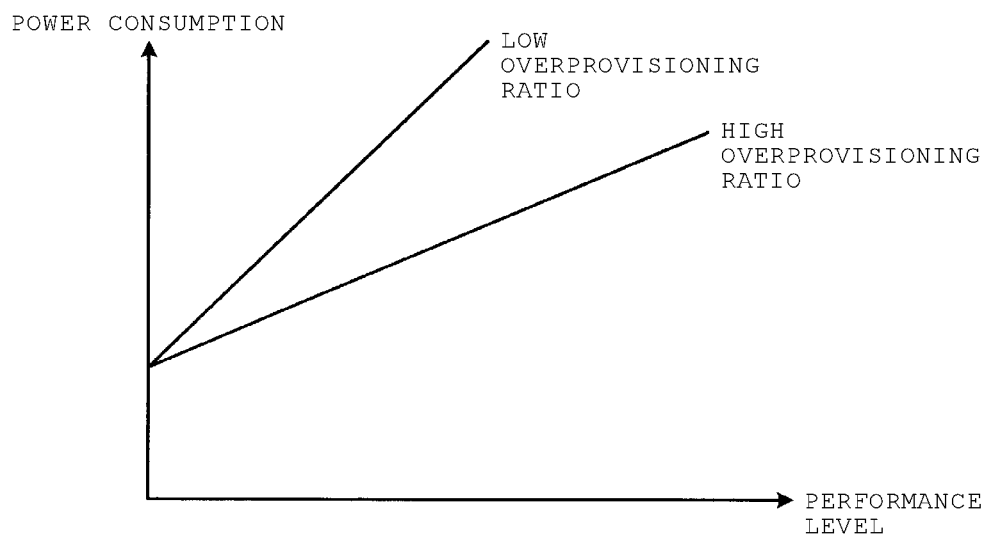
FIG. 9 is a graph illustrating one example of a relationship among the overprovisioning ratio, the power consumption, and the performance level.

FIG. 9 is a graph illustrating a relationship among the overprovisioning ratio, the power consumption, and the performance level, which is stipulated by the correspondence information 202. In FIG. 9, it is assumed that prescribed values are set for variables, respectively, other than the overprovisioning ratio, the power consumption, and the performance level. The amount of increased power consumption with respect to the amount of increased performance level is larger in a case where the overprovisioning ratio is a fifth value than in a case where the overprovisioning ratio is a sixth value that is greater than the fifth value. A factor of the overprovisioning ratio affecting the relationship between the performance level and the power consumption, for example, is obtained in advance by the measurement or the calculation, and, the correspondence information 202 is generated based on the obtained factor. The CPU 51 controls the overprovisioning ratio, and the calculator 104 acquires and uses the overprovisioning ratio. Moreover, the effect of the overprovisioning ratio on the relationship between the performance level and the power consumption is not limited to an example in FIG. 9.

Moreover, a magnitude of the effect of the overprovisioning ratio on the relationship between the power consumption and the performance level depends on the continuity of access positions. For example, the effect of the overprovisioning ratio on the power consumption and the performance level is greater in the case of the random write than in the case of the sequential write. This is because the free block can be generated more efficiently in the case of the sequential write than in the case of the random write. The overprovisioning ratio and the continuity of access positions may be prepared as variables of the correspondence information 202.

Moreover, a ratio of the total amount of data that are actually written to the NAND memory 11 to the amount of data that are sent to the memory system 1 during the host write is expressed as a write amplification factor (WAF). The correspondence information 202 may include the WAF as a variable instead of the overprovisioning ratio. The WAF is affected not only by the overprovisioning ratio, but also by the code rate. As the code rate decreases, the WAF increases. The calculator 104 may acquire the WAF by the calculation and the measurement, and may use the acquired WAF.

For example, temperature information is prepared as a variable of the correspondence information 202. The power consumption is obtained by adding up a static power and a dynamic power. The static power is a power consumed constantly regardless of the performance, and mostly composed of a leak power. The leak power is power that is lost due to a leak current that mostly occurs in the memory 52. The leak current occurs while the power is supplied, and does not occur while the power is not being supplied. The leak power changes according to a junction temperature of a circuit of the memory 52. The dynamic power is power that is consumed for transferring data within the memory system 1. It is assumed that dynamic power includes power that is consumed for carrying out the erasing operation, the read operation, and the write operation in each memory chip. That is, the higher the performance level is, the higher the dynamic power is.

Figure 10:
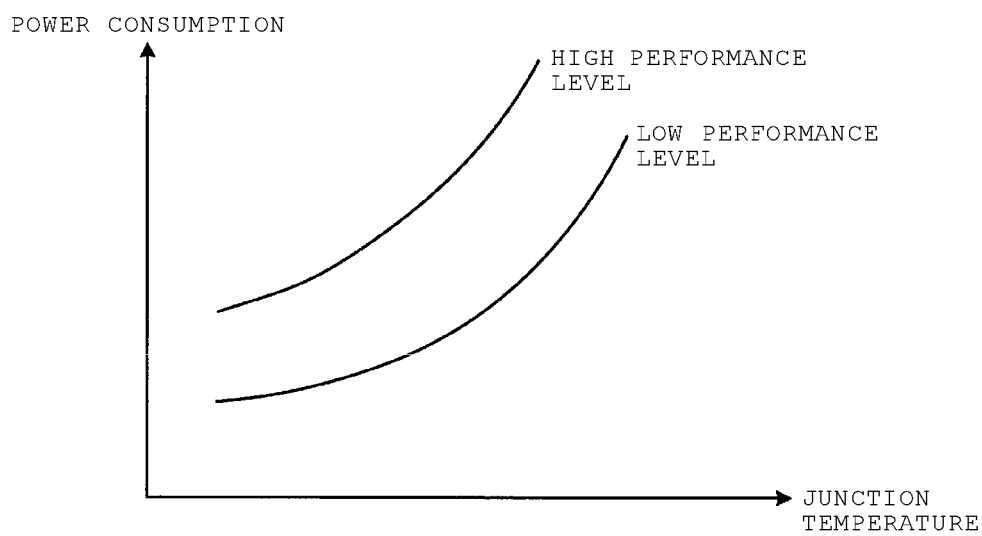
FIG. 10 is a graph illustrating one example of a relationship among a junction temperature, the power consumption, and the performance level.
Figure 11:
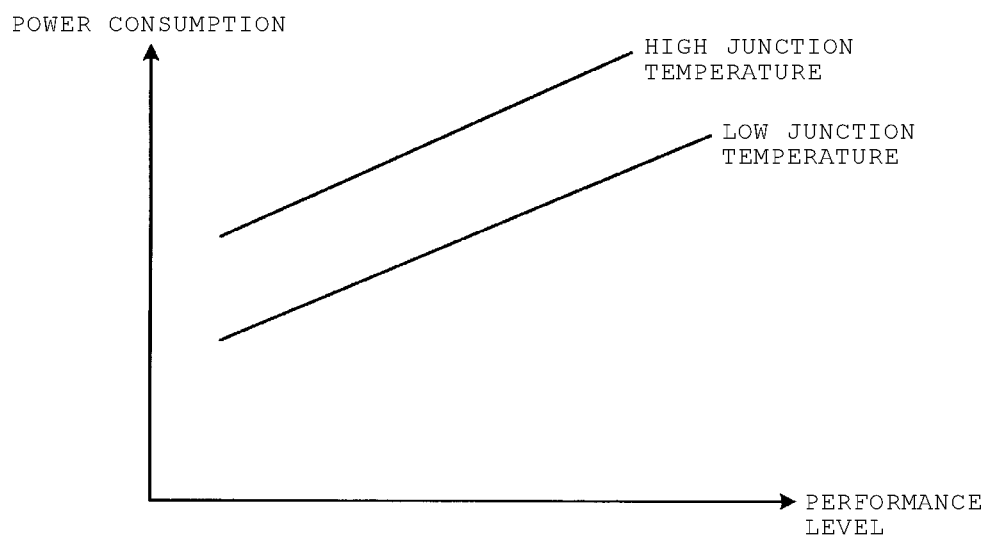
FIG. 11 is a graph illustrating one example of the relationship among the junction temperature, the power consumption, and the performance level.

FIGS. 10 and 11 are graphs each illustrating a relationship among the junction temperature, the power consumption, and the performance level, which is stipulated by the correspondence information 202. As illustrated in FIGS. 10 and 11, in a case where the junction temperatures are the same, the power consumption in a case where the performance level is high is higher than the power consumption in a case where the performance level is low. In a case where the performance levels are the same, the power consumption in a case where the junction temperature is higher than the power consumption in a case where the junction temperature is low.

For example, the temperature sensor 105 is located in the vicinity of the memory 52. The calculator 104 may compensate a detected value by the temperature sensor 105 by performing a prescribed arithmetic operation, and thus may obtain the junction temperature. In a case where the temperature sensor 105 is located in a position that is at a distance away from the memory 52 (for example, in a position that is at a distance away from the controller 10 within the memory system 1), the calculator 104 may estimate the junction temperature based on a formula that is designed in advance and on the detected value by the temperature sensor 105. A temperature may be input into the memory system 1 from the outside (for example, a case of a computer in which the memory system 1 is built, or the like). The calculator 104, for example, may estimate the junction temperature based on the temperature that is input from the outside. Furthermore, for example, instead of the junction temperature, the raw detected value itself by the temperature sensor 105 may be used as a variable of the correspondence information 202. As described above, this is because it is possible that the junction temperature is simply derived from the detected value by the temperature sensor 105. Moreover, an effect of the junction temperature on the relationship between the performance level and the power consumption is not limited to examples in FIGS. 10 and 11.

Figure 12:
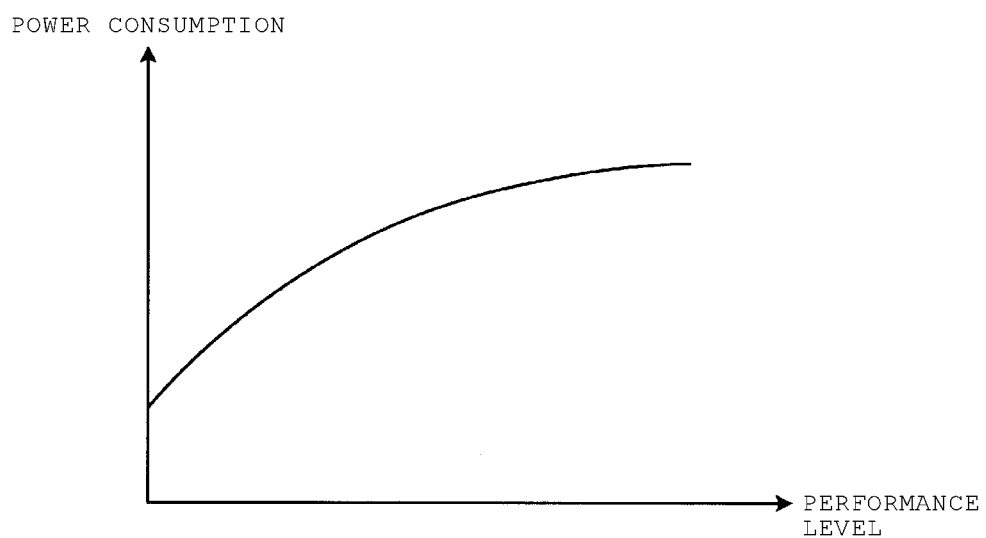
FIG. 12 is a graph illustrating another example of the relationship between the power consumption and the performance level.

In the embodiment described above, the relationship between the power consumption and the performance level is described as being linear if conditions other than the power consumption and the performance level are the same. On the other hand, the DC-DC converter 121 has the characteristic that efficiency is improved as a load increases. Considering the characteristic of the DC-DC converter 121, the ratio of the amount of increased power consumption to the amount of increased performance level decreases as the performance increases, for example, as illustrated in a graph in FIG. 12, when it comes to the relationship between the power consumption and the performance level. In this manner, the relationship between the power consumption and the performance level may not be linear.

Factors of various variables affecting the relationship between the performance level and the power consumption, for example, are obtained by the measurement or the arithmetic operation at the manufacturing time, and, based on the obtained factors, the correspondence information 202 is generated. The factors of the various variables affecting the relationship between the performance level and the power consumption may be individually measured for each memory system 1. Accordingly, the power consumption can be controllable without depending on the manufacturing variations of the memory system 1. The effects of the factors of the various variables on the relationship between the performance level and the power consumption may be measured for one sample as a representative for a plurality of memory systems 1 (for example, one sample for each manufacturing lot of the memory system 1).

Figure 13:
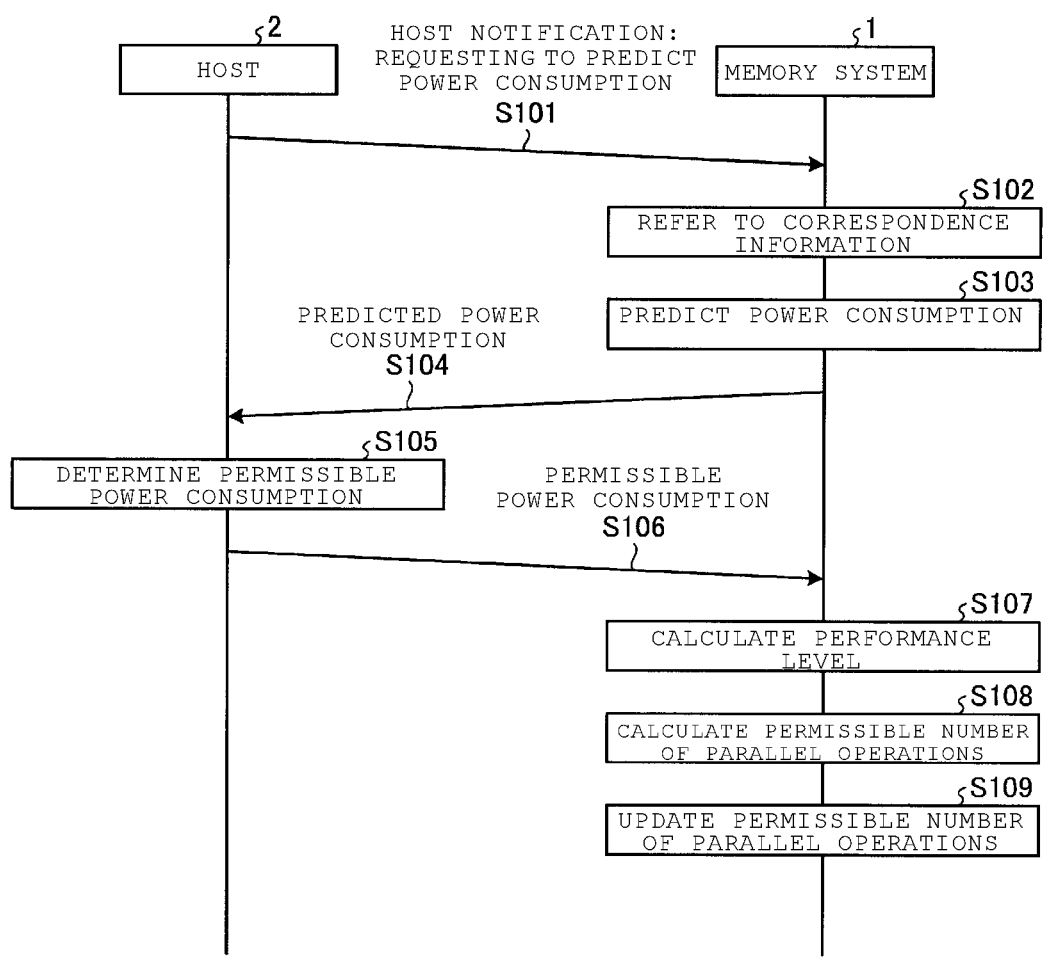
FIG. 13 is a sequence diagram of an operation of the memory system according to the first embodiment.

FIG. 13 is a sequence diagram of an operation of the memory system 1 according to the first embodiment. First, the host 2 transmits the host notification to the memory system 1 (S101). In the memory system 1, upon receiving the host notification, the calculator 104 acquires values that are set for various variables of the correspondence information 202 (S102). Based on each acquired value and the correspondence information 202, the calculator 104 calculates the power consumption (that is, the predicted power consumption in a case where the performance that is notified by the host notification is achieved) (S103).

Here, "acquire" includes an arithmetic operation, reference, and estimation. The reference includes reference to a constant (fixed) value that is set in advance and reference to a dynamic value (a state variable) that changes dynamically. In a case where, among one or more variables of the correspondence information 202, a variable for which a fixed value for performing the arithmetic operation of a prediction performance is set is present, the calculator 104 refers to the fixed value. Furthermore, the calculator 104 refers to the host notification, and obtains the access pattern. Furthermore, for example, the overprovisioning ratio is set as the state variable in a prescribed storage area (for example, the memory 52), and is updated according to an operation status. The calculator 104 refers to the overprovisioning ratio that is set in a prescribed storage area. For example, the calculator 104 performs the arithmetic operation of or makes estimation of the junction temperature based on the detected value by the temperature sensor 105. In this manner, according to a type of a variable, the calculator 104 performs the arithmetic operation, makes reference to, or makes estimation to a value that has to be set for the variable of the correspondence information 202.

In processing in S103, the calculator 104, for example, sets values for all variables except for the power consumption, among a plurality of variables of the correspondence information 202. Then, the calculator 104 uses the power consumption that is determined from the correspondence information 202 and the value that is set for each variable, as the predicted power consumption.

The CPU 51 transmits the predicted power consumption, which is calculated by the calculator 104, to the host 2 (S104). The host 2 decides the permissible power consumption based on the predicted power consumption (S105).

It is possible that a method of performing S105 is flexibly designed. For example, the host 2 calculates the power consumption that is allocated to the memory system 1, based on the balance of the entire power consumption of a system, which includes a plurality of memory systems 1 and one ore more hosts 2, etc. Furthermore, the host 2 decides the power consumption that is to be allocated to the memory system 1, considering an amount of heat that is dissipated by the memory system 1. In a case where the predicted power consumption does not exceed the power consumption that is to be allocated to the memory system 1, the host 2 sets the predicted power consumption, as the permissible power consumption. In a case where the predicted power consumption exceeds the power consumption that is to be allocated to the memory system 1, the host 2 sets the power consumption that is to be allocated to the memory system 1, as the permissible power consumption.

The host 2 transmits the permissible power consumption to the memory system 1 (S106). When the memory system 1 receives the permissible power consumption, the performance control IF 101 stores the received permissible power consumption as the permissible power consumption 201 in the power control information unit 103. The calculator 104 calculates the maximum performance level that can be achieved within the permissible power consumption 201 (S107). In processing in S107, the calculator 104, for example, sets values for all variables except for the performance level, among a plurality of variables of the correspondence information 202.

The calculator 104 calculates the permissible number of parallel operations based on the performance level that is obtained by the processing in S107 (S108). A relationship between the performance level and the number of parallel operations is set in advance for the memory system 1. For example, information (for example, a table or a function) that stipulates the relationship between the performance level and the number of parallel operations is stored in advance in a prescribed storage area (for example, the NAND memory 11). The calculator 104, for example, performs the arithmetic operation of obtaining the permissible number of parallel operations 203 using the information and the performance level that results from the arithmetic operation. The calculator 104 stores the permissible number of parallel operations 203, which results from the arithmetic operation, in the power control information unit 103.

The resource control unit 102 updates the number of parallel operations (S109). Specifically, the resource control unit 102 controls the parallel operating resources 50 in such a manner that the number of parallel operations is equal to or less than the permissible number of parallel operations 203.

Moreover, as described with reference to FIG. 13, the host 2 is described as deciding the permissible power consumption and notifying the memory system 1 of the decided permissible power consumption. In a case where the power consumption that is to be allocated to the memory system 1 is higher than the predicted power consumption, the host 2 may transmit a permission notification in S106. In response to the permission notification, the performance control IF 101 stores the predicted power consumption that has been transmitted to the host as the permissible power consumption 201 in the power control information unit 103.

Furthermore, the calculator 104 is described as calculating the maximum performance level that can be achieved within the permissible power consumption 201, in S107. The calculator 104 may not necessarily calculate the maximum performance if the maximum performance level can be achieved within the permissible power consumption 201.

Moreover, the resource control unit 102 described above adjusts the performance level by changing the number of parallel operations. However, the method of adjusting the performance level is not limited to the method of using the number of parallel operations. For example, the resource control unit 102 can adjust the performance level by adding a waiting time before sending a response to the host 2 (i.e., delaying the response). The response includes data read from the NAND memory 11 according to a read command. Furthermore, the response may be an execution completion notification that corresponds to a command from the host 2. In a case where the response is transmitted in a plurality of packets, the resource control unit 102 may add the waiting time between the packets. The resource control unit 102 performs the arithmetic operation of calculating the length of the waiting time, according to the performance level that is obtained by the arithmetic operation in S108.

Furthermore, any method can be employed for negotiation between the memory system 1 and the host 2. For example, the host 2 may transmit the host notification and the permissible power consumption to the memory system 1, and the memory system 1 may calculate the predicted power consumption based on the host notification and may operate at the maximum performance level that can be achieved with the higher power consumption of the predicted power consumption and the permissible power consumption. For example, the host 2 may transmit the permissible power consumption to the memory system 1, and the memory system 1 may operate at the maximum performance that can be achieved with the received permissible power consumption.

As described above, according to the first embodiment, the memory system 1 includes the calculator 104 that is notified of the access pattern and the performance level by the host 2 and that calculates the predicted power consumption based on the access pattern and the performance level, and on the overprovisioning ratio. The access pattern, the performance level, and the overprovisioning ratio are factors (elements) that may dynamically change. Because the calculator 104 predicts the power consumption based on these factors (elements), the power consumption can be predicted with high precision. The usability of the memory system 1 can be enhanced because the memory system 1 can predict the consumption with high precision.

Furthermore, an effect of the access pattern on the relationship between the performance level and the power consumption is greater than the effect of the other variables described above. Because the calculator 104 predicts the power consumption using the access pattern, this improves the precision of prediction. Furthermore, the effect of the overprovisioning ratio changes according to the continuity of access positions. For example, the effect of the overprovisioning ratio is greater in the case of the random write than in the case of the sequential write. Because the calculator 104 predicts the power consumption using the access pattern and the overprovisioning ratio, this improves the precision of prediction. Moreover, any index other than the overprovisioning ratio is available as a variable, as long as such an index indicates a relationship between an entire storage capacity in the NAND memory 11 (a physical capacity), which is available for storing the user data, and a user capacity.

Moreover, the calculator 104 may calculate the predicted power consumption based only on the overprovisioning ratio and the performance. In a case where the calculator 104 is configured in such a manner as to calculate the predicted power consumption based only on the overprovisioning ratio and the performance level, the relationship between the performance level and the power consumption may be stipulated in the correspondence information 202 for the random write.

Furthermore, the memory system 1 further includes the temperature sensor 105. The calculator 104 predicts the power consumption by further using the detected value by the temperature sensor 105. As described above, the leak power of the memory 52 changes according to the junction temperature. The junction temperature also is a factor (an element) that may dynamically change. Because it is possible that the power consumption is predicted considering the factors of the junction temperature, this improves the precision of prediction. Moreover, the calculator 104 may perform the arithmetic operation of obtaining the junction temperature from the detected value by the temperature sensor 105. The detected value by the temperature sensor 105 may be used as a variable of the correspondence information 202 instead.

Furthermore, the calculator 104 predicts the power consumption by further using the code rate. The code rate also is a factor (an element) that may dynamically change. Because the calculator 104 predicts the power consumption using the code rate, this improves the precision of prediction. Moreover, the code rate is one of the indexes that indicate a relationship between a size of pre-coding user data and a size of post-coding user data. Any index other than the code rate is available as a variable, as long as such an index is an index that indicates the relationship between the size of the pre-coding user data and the size of the post-coding user data.

Furthermore, the calculator 104 predicts the power consumption by further using t_prog. t_prog decreases according to exhaustion of the memory cells. That is, t_prog also is a factor (an element) that may dynamically change. Because the calculator 104 predicts the power consumption using t_prog, this improves the precision of prediction. Moreover, the degree of the exhaustion of the memory cells is available instead of t_prog.

Furthermore, the calculator 104 calculates a throughput that can be achieved with the permissible power consumption. Accordingly, it is possible that the memory system 1 operates at the power consumption that does not exceed the permissible power consumption. Moreover, the permissible power consumption is notified by the host 2. The permissible power consumption may be determined in advance.

Second Embodiment

Figure 14:
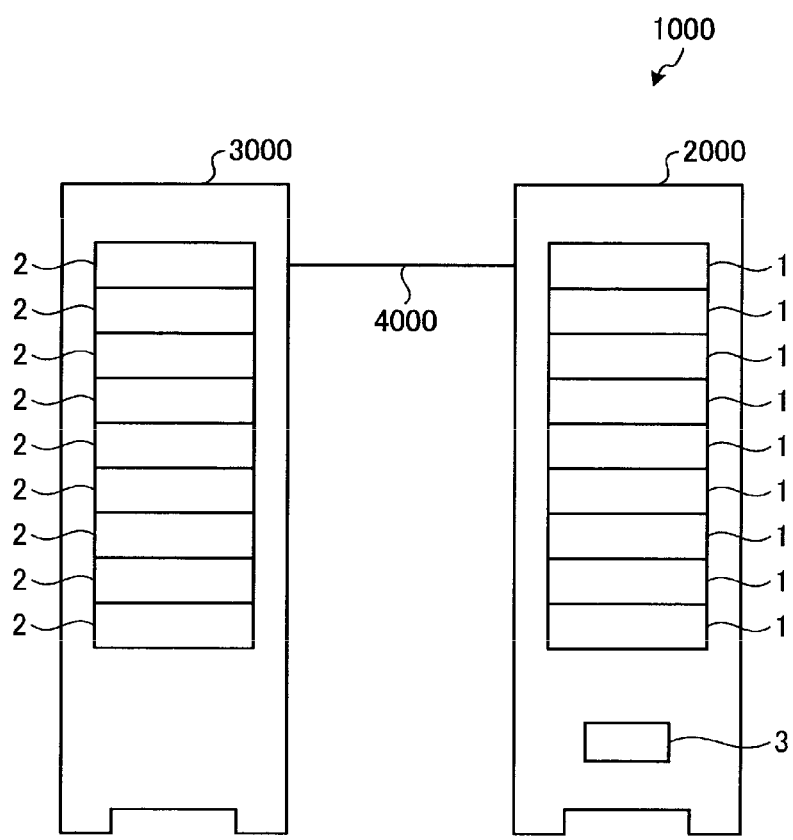
FIG. 14 illustrates an implementation example of the memory system.

FIG. 14 illustrates an implementation example of the memory system 1 mounted. The memory system 1, for example, is mounted in a server system 1000. The server system 1000 is configured by connecting a disk array 2000 and a rack-mounted server 3000 to each other through a communication interface 4000. Any standard is applicable as a standard of the communication interface 4000. The rack-mounted server 3000 includes a server rack, and one or more hosts 2 are mounted on the server rack. Furthermore, the disk array 2000 includes a server rack, and one or more memory systems 1 are mounted on the server rack. Moreover, a different unit, such as an HDD, may be mounted on the server rack of the disk array 2000. The disk array 2000 includes the power supply 3. Power from the power supply 3 is supplied to each unit mounted on the disk array 2000, through a back plane that is not illustrated. Moreover, in a case where a plurality of memory systems 1 is included in the disk array 2000, the plurality of memory systems 1 may constitute a RAID.

The host 2 may perform an arithmetic operation of calculating the permissible power consumption for every memory system 1 in such a manner that a temperature within the disk array 2000 does not exceed a prescribed value. Furthermore, the host 2 may perform an arithmetic operation of calculating the permissible power consumption for every memory system 1 based on a power supply capability of the power supply 3 and the number of memory systems 1 that are included in the disk array 2000. Because each of the memory systems 1 has the configuration described in the first embodiment, each of the memory systems 1 can deliver the maximum performance that can be achieved at the permissible power consumption.

While certain embodiments have been described, these embodiments have been presented byway of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage device comprising:
a nonvolatile semiconductor memory;
a temperature sensor; and
a controller configured to
in response to a request to predict power consumption, the request received from a host and designating access pattern and throughput,
predict power consumption that is required to carry out operations based on temperature of the storage device detected by the temperature sensor, the access pattern designated in the request, the throughput designated in the request, and an overprovisioning ratio, an amount of increased power consumption with respect to an amount of increased performance level being larger in a case where the overprovisioning ratio is a first value than in a case where the overprovisioning ratio is a second value, the second value being greater than the first value,
notify the predicted power consumption to the host,
receive permissible power consumption from the host, the permissible power consumption being determined on the basis of the predicted power consumption notified to the host,
determine operating resources of at least one of the nonvolatile semiconductor memory and the controller to carry out the operations, on the basis of the permissible power consumption received from the host, and
carry out the operations using the determined operating resources.

2. The storage device according to claim 1, wherein
the nonvolatile semiconductor memory includes a plurality of channels accessible in parallel, each of which is individually connected to the controller through a bus and includes one or more nonvolatile semiconductor memory chips, and
determining the operating resources includes determining a number of channels to be used in parallel for the operations.

3. The storage device according to claim 1, wherein
the nonvolatile semiconductor memory includes a plurality of banks accessible in an interleaved manner, each of the banks including one or more nonvolatile semiconductor chips, and
determining the operating resources includes determining a number of banks to be accessed in parallel in the interleaved manner for the operations.

4. The storage device according to claim 1, wherein
the nonvolatile semiconductor memory includes a plurality of memory chips operating in parallel with each other, and
determining the operating resources includes determining a number of memory chips to operate in parallel for the operations.

5. The storage device according to claim 1, wherein
the controller includes a plurality of processors that are capable of operating in parallel, and
determining the operating resources includes determining a number of processors to be used in parallel for the operations.

6. The storage device according to claim 1, wherein
the access pattern indicates at least one of a ratio of a number of read operations to a number of write operations and continuity of addresses in the storage device to be accessed.

7. The storage device according to claim 1, wherein
the controller is further configured to encode data to be written into the nonvolatile semiconductor memory at a selected code rate, which corresponds to a ratio of a size of data before encoding to a size of the data after encoding, and predict the power consumption based also on the selected code rate.

8. The storage device according to claim 1, wherein
the nonvolatile semiconductor memory includes one or more nonvolatile semiconductor memory chips, and
the controller is configured to predict the power consumption based also on a processing time required to program each of the nonvolatile semiconductor chips in response to a write command.

9. The storage device according to claim 1, wherein
the controller is configured to predict the power consumption further based also on a write amplification factor.

10. The storage device according to claim 1, wherein
the controller is configured to predict the power consumption such that, under a condition that performance levels are same, the power consumption at a first junction temperature is higher than the power consumption at a second junction temperature, the first junction temperature being higher than the second junction temperature.

11. A storage device comprising:
a nonvolatile semiconductor memory;
a temperature sensor; and
a controller configured to
   in response to a request to predict power consumption, the request received from a host and designating access pattern and throughput,
   predict power consumption that is required to carry out operations based on temperature of the storage device detected by the temperature sensor, the access pattern received from the host, the throughput received from the host, and an overprovisioning ratio, an amount of increased power consumption with respect to an amount of increased performance level being larger in a case where the overprovisioning ratio is a first value than in a case where the overprovisioning ratio is a second value, the second value being greater than the first value,
   determine a resource for at least one of the nonvolatile semiconductor memory and the controller for carrying out the operations, based on lesser of the predicted power consumption and permissible power consumption that is received from the host, and
   carry out the operations using the determined resource.

12. The storage device according to claim 11, wherein
the nonvolatile semiconductor memory includes a plurality of channels accessible in parallel, each of which is individually connected to the controller through a bus and includes one or more nonvolatile semiconductor memory chips, and
determining the resource includes determining a number of channels to be used in parallel for the operations.

13. The storage device according to claim 11, wherein
the nonvolatile semiconductor memory includes a plurality of banks accessible in an interleaved manner, each of the banks including one or more nonvolatile semiconductor chips, and
determining the resource includes determining a number of banks to be accessed in parallel in the interleaved manner for the operations.

14. The storage device according to claim 11, wherein
the nonvolatile semiconductor memory includes a plurality of memory chips operating in parallel with each other, and
determining the operating resources includes determining a number of memory chips to operate in parallel for the operations.

15. The storage device according to claim 11, wherein
the controller includes a plurality of processors that are capable of operating in parallel, and
determining the resource includes determining a number of processors to be used in parallel for the operations.

16. The storage device according to claim 11, wherein
the access pattern indicates at least one of a ratio of a number of read operations to a number of write operations and continuity of addresses in the storage device to be accessed.

17. The storage device according to claim 11, wherein
the controller is further configured to encode data to be written in the nonvolatile semiconductor memory at a selected code rate, which corresponds to a ratio of a size of data before encoding and a size of the data after encoding, and predict the power consumption based also on the selected code rate.

18. The storage device according to claim 11, wherein
the nonvolatile semiconductor memory includes one or more nonvolatile semiconductor memory chips, and
the controller is configured to predict the power consumption based also on a processing time required to program each of the nonvolatile semiconductor memory chips in response to a write command.

19. The storage device according to claim 11, wherein
the controller is configured to predict the power consumption such that, under a condition that performance levels are same, the power consumption at a first junction temperature is higher than the power consumption at a second junction temperature, the first junction temperature being higher than the second junction temperature.

* * * * *